US012439190B2

(12) United States Patent
Qureshi et al.

(10) Patent No.: US 12,439,190 B2
(45) Date of Patent: Oct. 7, 2025

(54) MEMS MICROPHONE WITH INGRESS PROTECTION

(71) Applicant: Casella Holdings Limited, Bedfordshire (GB)

(72) Inventors: Aamir Qureshi, Cambridgeshire (GB); Brandon Trainer, Bedfordshire (GB); Andy Mitham, Hertfordshire (GB)

(73) Assignee: Casella Holdings Limited (GB)

( * ) Notice: Subject to any disclaimer, the term of this patent is extended or adjusted under 35 U.S.C. 154(b) by 266 days.

(21) Appl. No.: 17/802,946

(22) PCT Filed: Feb. 24, 2021

(86) PCT No.: PCT/US2021/019437
§ 371 (c)(1),
(2) Date: Aug. 27, 2022

(87) PCT Pub. No.: WO2021/173688
PCT Pub. Date: Sep. 2, 2021

(65) Prior Publication Data

US 2023/0146074 A1 May 11, 2023

Related U.S. Application Data

(60) Provisional application No. 62/982,429, filed on Feb. 27, 2020.

(51) Int. Cl.
*H04R 19/04* (2006.01)
*H04R 1/08* (2006.01)

(52) U.S. Cl.
CPC ............. *H04R 1/086* (2013.01); *H04R 19/04* (2013.01); *H04R 2201/003* (2013.01)

(58) Field of Classification Search
CPC .. H04R 1/086; H04R 19/04; H04R 2201/003; H04R 1/222; H04R 1/04
See application file for complete search history.

(56) References Cited

U.S. PATENT DOCUMENTS 7,773,762 B2 * 8/2010 Akino .................... H04R 19/04 381/174
9,936,306 B1 4/2018 Zhang
(Continued)

FOREIGN PATENT DOCUMENTS

JP 6644965 B2 2/2020
WO 2019246079 A1 12/2019

OTHER PUBLICATIONS

ISA/US, Int. Search Report and Written Opinion issued for PCT application No. PCT/US21/19437, dated Jul. 15, 2021, 16 pages.
(Continued)

*Primary Examiner* — Brian Ensey
(74) *Attorney, Agent, or Firm* — Greenberg Traurig, LLP

(57) ABSTRACT

A microphone assembly includes a housing defining an acoustic cavity having a sound inlet for transmitting a sound in to the acoustic cavity. A micro-electro-mechanical (MEMS) microphone is located at least partially within the housing adjacent the acoustic cavity. The MEMS microphone includes a microphone aperture acoustically coupled with the aperture of the housing. An acoustic vent is located adjacent the microphone aperture to substantially allow sound to pass through the acoustic vent while substantially preventing a foreign contaminant from entering the microphone aperture.

19 Claims, 8 Drawing Sheets

(56) References Cited

U.S. PATENT DOCUMENTS

| | | | | |
|---|---|---|---|---|
| 2013/0142358 | A1 | 6/2013 | Schultz et al. | |
| 2014/0044297 | A1 | 2/2014 | Loeppert et al. | |
| 2015/0043747 | A1* | 2/2015 | Barham | H03G 3/20 381/98 |
| 2015/0139432 | A1 | 5/2015 | Barwicz et al. | |
| 2018/0091881 | A1* | 3/2018 | Evans | H04R 1/08 |

OTHER PUBLICATIONS

Extended European Search Report from EP application No. 21760020.4, dated Mar. 18, 2024, 10 pp.

* cited by examiner

| | |
|---|---|
| MIC TYPE | 0.00 |
| SERIAL NO. | 0 |
| DATE | 00–JAN–00 |
| HZ | dB |
| 31.5 | –0.01 |
| 63 | –0.01 |
| 125 | –0.01 |
| 250 | –0.02 |
| 500 | –0.01 |
| 1000 | 0.00 |
| 2000 | –0.24 |
| 4000 | –0.09 |
| 8000 | –0.15 |
| 12500 | –4.91 |
| 16000 | –4.09 |
| 20000 | –0.02 |
| TESTED BY | 0.00 |

MEMS MICROPHONE WITH INGRESS PROTECTION

CROSS REFERENCE TO RELATED APPLICATION

This application is a non-provisional application claiming priority from U.S. Provisional Application Ser. No. 62/982,429, filed Feb. 27, 2020 entitled "MEMS Microphone with Ingress Protection" and incorporated herein by reference in its entirety.

FIELD OF THE DISCLOSURE

The present description relates generally to micro-electro-mechanical systems (MEMS) microphones and more particularly to a MEMS microphone assembly with ingress protection.

BACKGROUND OF RELATED ART

In general, the application of MEMS technology to microphones has led to the development of small microphones with very high performance. For example, MEMS microphones typically offer high signal to noise ratio (SNR), relatively low power consumption, and good sensitivity. A typical MEMS microphone, however, has a frequency response which is not compliant with IEC61672 Class 2 limits.

Accordingly, there remains a strong desire for improved MEMS microphones, and more particularly for a more simplified and easily assembled, MEMS microphone complete with ingress protection that achieves class 2 response by adding different components around the MEMS microphone to form a special construction as disclosed herein.

SUMMARY

In one embodiment, A microphone assembly comprises a microphone housing defining an acoustic cavity and comprising a sound inlet for transmitting a sound into the acoustic cavity. A micro-electro-mechanical (MEMS) microphone is operatively mounted at least partially within the microphone housing and comprising an aperture acoustically coupled with the acoustic cavity for receiving the sound. A MEMS microphone support is adjustably coupled to the microphone housing for supporting the MEMS microphone within the microphone housing, the MEMS microphone support being movable relative to the acoustic cavity to vary the acoustic characteristics of the microphone assembly. An acoustic vent is located between the acoustic cavity and the aperture to substantially allow the sound to pass through the acoustic vent while substantially preventing a foreign contaminant from entering the aperture.

DETAILED DESCRIPTION

The following description of example methods and apparatus is not intended to limit the scope of the description to the precise form or forms detailed herein. Instead the following description is intended to be illustrative so that others may follow its teachings.

Currently known and typical MEMS microphones have a frequency response which is not compliant with IEC 61672 Class 2 limits. In order to achieve Class 2 response from a known commercial MEMS microphone, its frequency response has to be altered. This is achieved by adding different components around the microphone to form a special construction, such as disclosed herein.

Figure 1:
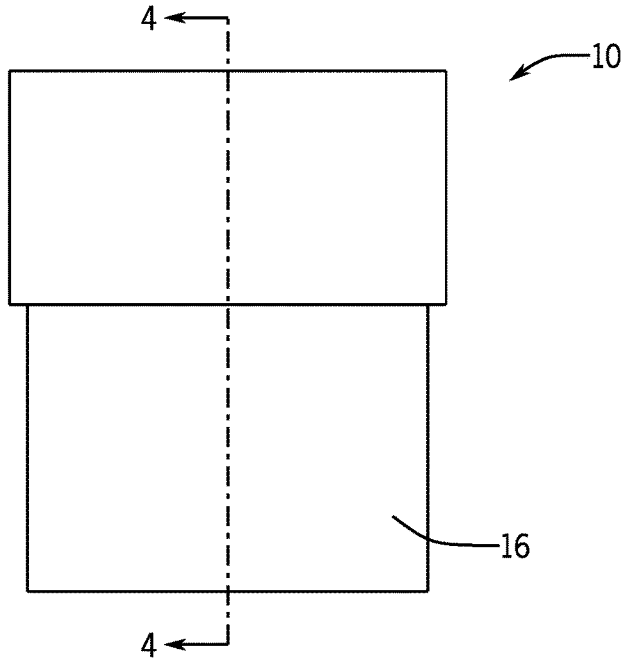
FIG. 1 is a side elevational view of an example MEMS microphone with ingress protection in accordance with an example of the teachings of the present disclosure.
Figure 3:
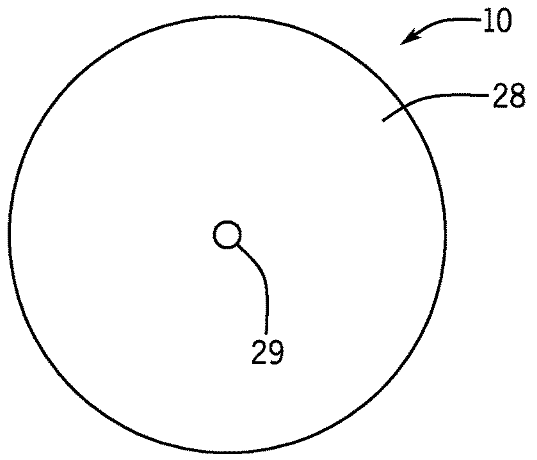
FIG. 3 is a top plan view of the example MEMS microphone of FIG. 1.
Figure 2:
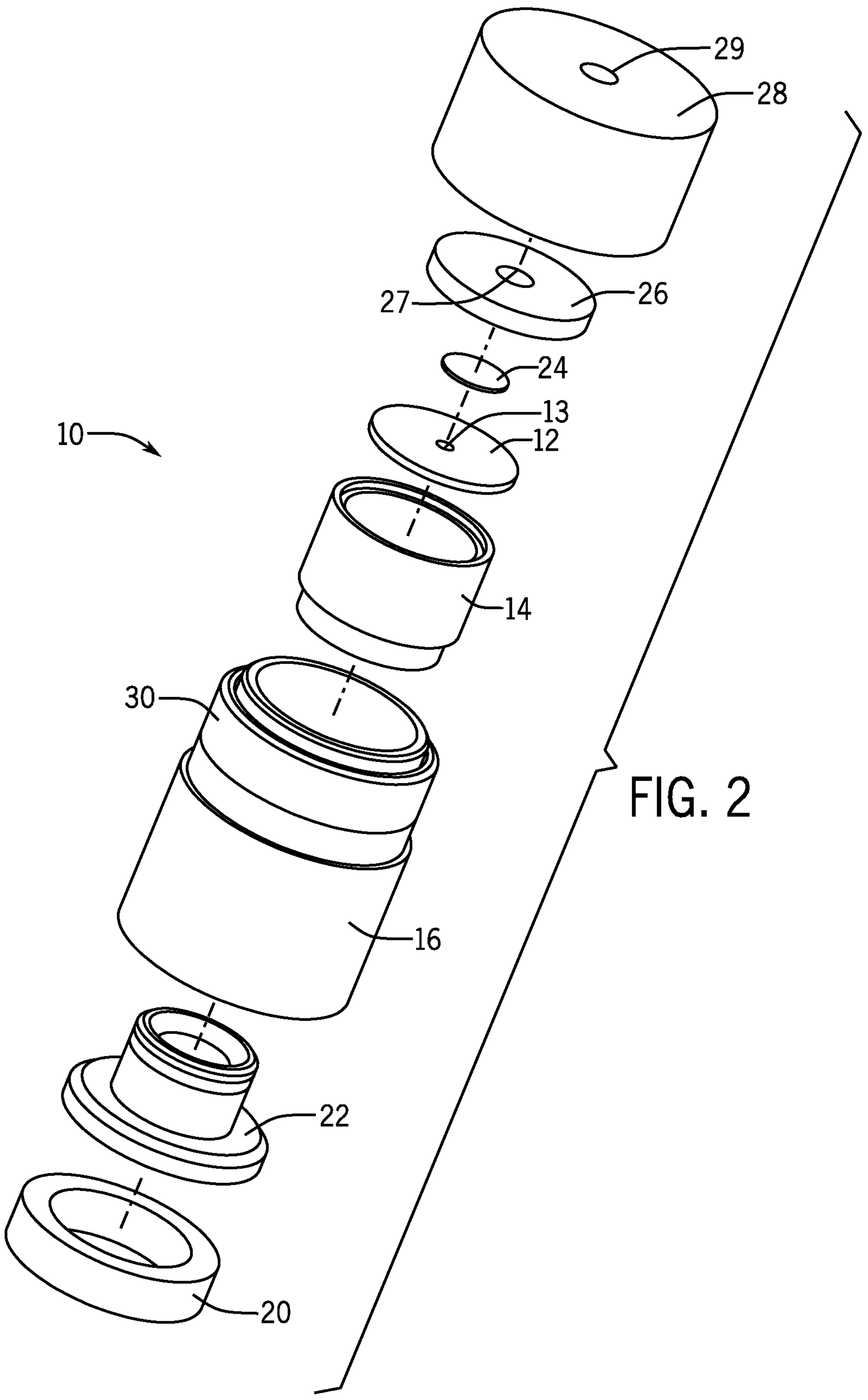
FIG. 2 is an exploded perspective view of the example MEMS microphone of FIG. 1.
Figure 4:
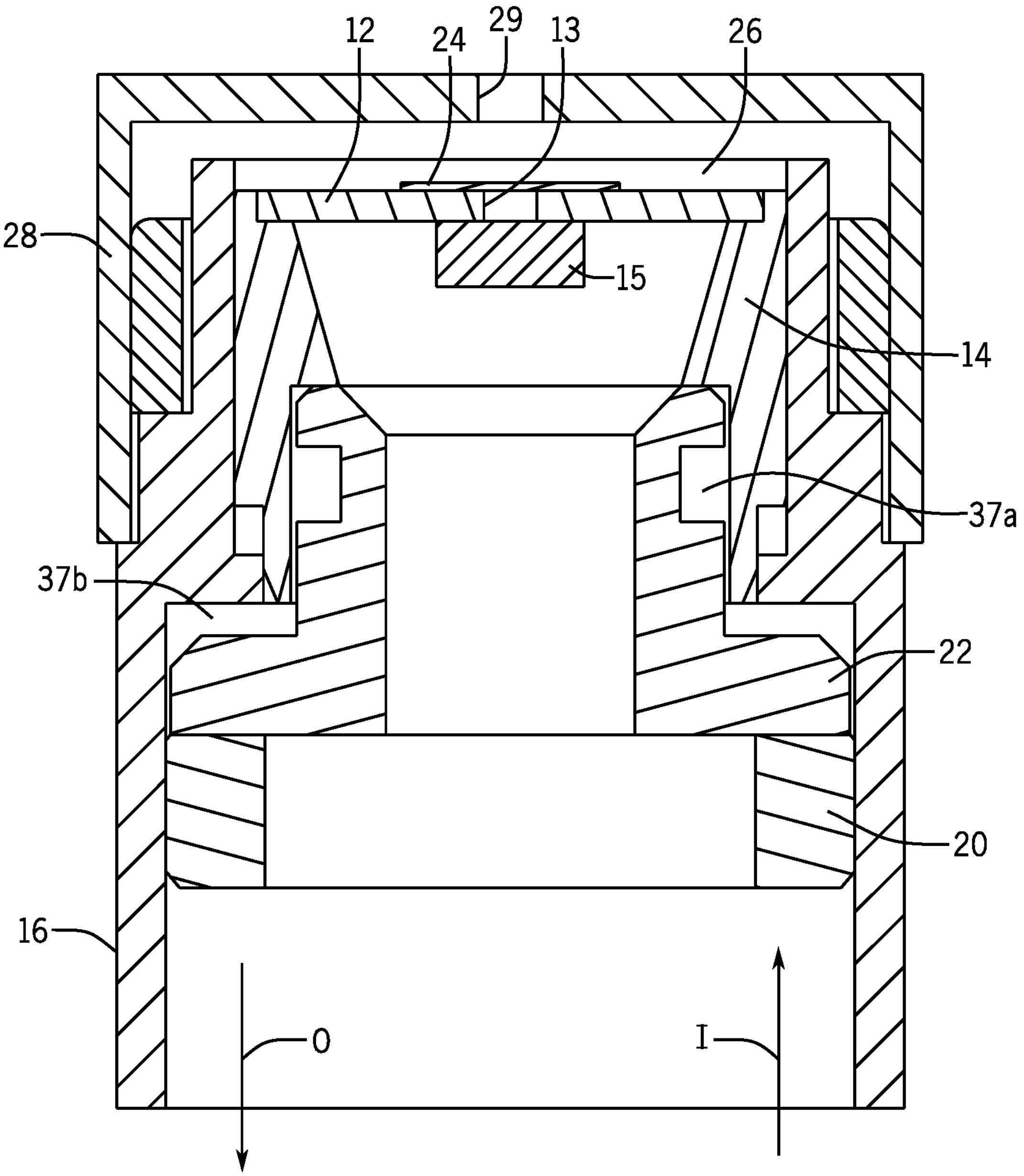
FIG. 4 is a cross section view of the example MEMS microphone taken along line 4-4 of FIG. 1.

Referring now to FIGS. 1-4, an example MEMS microphone assembly 10 is illustrated. The example MEMS microphone assembly 10 generally comprises a stack built into a 0.5 inch microphone, although it will be appreciated by one of ordinary skill in the art that the size of the example MEMS microphone assembly 10 may vary as desired. As best illustrated in FIGS. 2 and 4, the example MEMS microphone assembly 10 includes a microphone printed circuit board (PCB) 12 defining an aperture 13 and a MEMS microphone 15 as is known in the art to for detecting sound. The aperture 13 may be any suitable wave guide such as an acoustic wave guide. It will be understood that the MEMS microphone 15 may be top-ported (i.e., the hole is in a top cover) or bottom-ported (i.e., the hole is in the microphone PCB) as desired. In the illustrated example, the microphone PCB 12 is a 0.5 mm microphone PCB, although any suitable PCB and/or MEMS microphone may be utilized. The microphone PCB 12 is supported by a PCB support 14, which in turn is housed within a microphone housing 16. The space defined between the microphone housing 16 and the microphone PCB 12 is an acoustic cavity having acoustic characteristics that may be varied by any suitable means including varying the size of the acoustic cavity and/or the materials defining the acoustic cavity.

In this example, the PCB support 14 and the microphone housing 16 are generally cylindrical and coaxial aligned along their respective longitudinal axis when the PCB support 14 is inserted within the microphone housing 16. A lock ring 20 and a support spacer 22 are provided within the microphone housing 16 to secure the PCB support 14 within the microphone housing 16. As will be understood, the lock ring 20 may be fitted or otherwise secured within the microphone housing 16 by threads, friction fitting, etc.

While the microphone PCB 12 is mounted to and supported by the PCB support 14, an acoustic vent 24 is positioned over the aperture 13 in the microphone PCB 12 and sealingly mounted thereto. In the illustrated example, the acoustic vent 24 is a GORE® Portable Electronic Vent for Acoustic and Immersion applications available from W. L. Gore & Associates, Inc, Elkton, MD, USA, model GAW334. The provided acoustic vent comprises an expanded polytetrafluoroethylene (ePTFE) material that allows for the transmission of air and sound, while effectively repelling water, other fluids and particulates, thus substantially preventing and/or minimizing ingress of any foreign contaminant into the aperture 13. It will be understood by one of ordinary skill in the art that while a specific acoustic vent is identified, other suitable acoustic vents may be utilized as desired.

As further illustrated, a porous material, such as a foam disk 26, which, in this example optionally defines another aperture 27, is provided over the microphone PCB 12 and the acoustic vent 24. Finally, the assembly is enclosed by a microphone front grill 28 having yet another aperture 29 (e.g., a sound inlet), and being mounted to the microphone housing 16, such as by a screw thread, friction fit or other suitable closure. In this example, a ring 30 surrounding an upper portion of the microphone housing 16 and contacts an inner surface of the microphone front grill 28 to provide a spacing. In some examples, the microphone front grill 28 may be slidably coupled to the microphone housing 16 such that the space defined between the microphone front grill 28 and the foam disk 26 may be varied, hence the defined cavity may be a bespoke design. The PCB support 14 may, therefore, support the microphone PCB 12 proximate the microphone front grill 28 such that the aperture 29, acoustic cavity, and aperture 13 are acoustically coupled. In addition, as illustrated, the position of the lock ring 20 within the microphone housing 16 may allow for the formation of an upper air gap 37*a* and a lower air gap 37*b*. If the lock ring 20 is screwed in (direction arrow I), the lower air gap 37*b* will close up and the MEMS microphone 15 will move closer to the microphone front grill 28. If, however, the lock ring is un-screwed (direction arrow O), the upper air gap 37*a* will close up and the MEMS microphone 15 will move further away from the microphone front grill 28. Accordingly, the MEMS microphone assembly 10 may be tunable as desired.

The MEMS microphone assembly 10 may also be tuned by selection of various microphone PCBs with a sufficient dynamic range. The acoustically transparent, acoustic vent 24, meanwhile, provides for ingress protection. The designed simple stack of different materials achieves acoustically tuned, sealed, resonance cavity, overcoming problems with repeatability and also resulting in ease of assembly. For instance, the construction of tuning cavities around the microphone PCB 12 is very simple when compared to known prior art assemblies. By utilizing layers of some soft materials and precisely designed hard layers in a unique way, the MEMS microphone assembly 10 achieves the target Class 1&2 response. Further, the present design provides a unique way of adjusting the microphone height to aid tuning of the resonant cavity.

Figure 5:
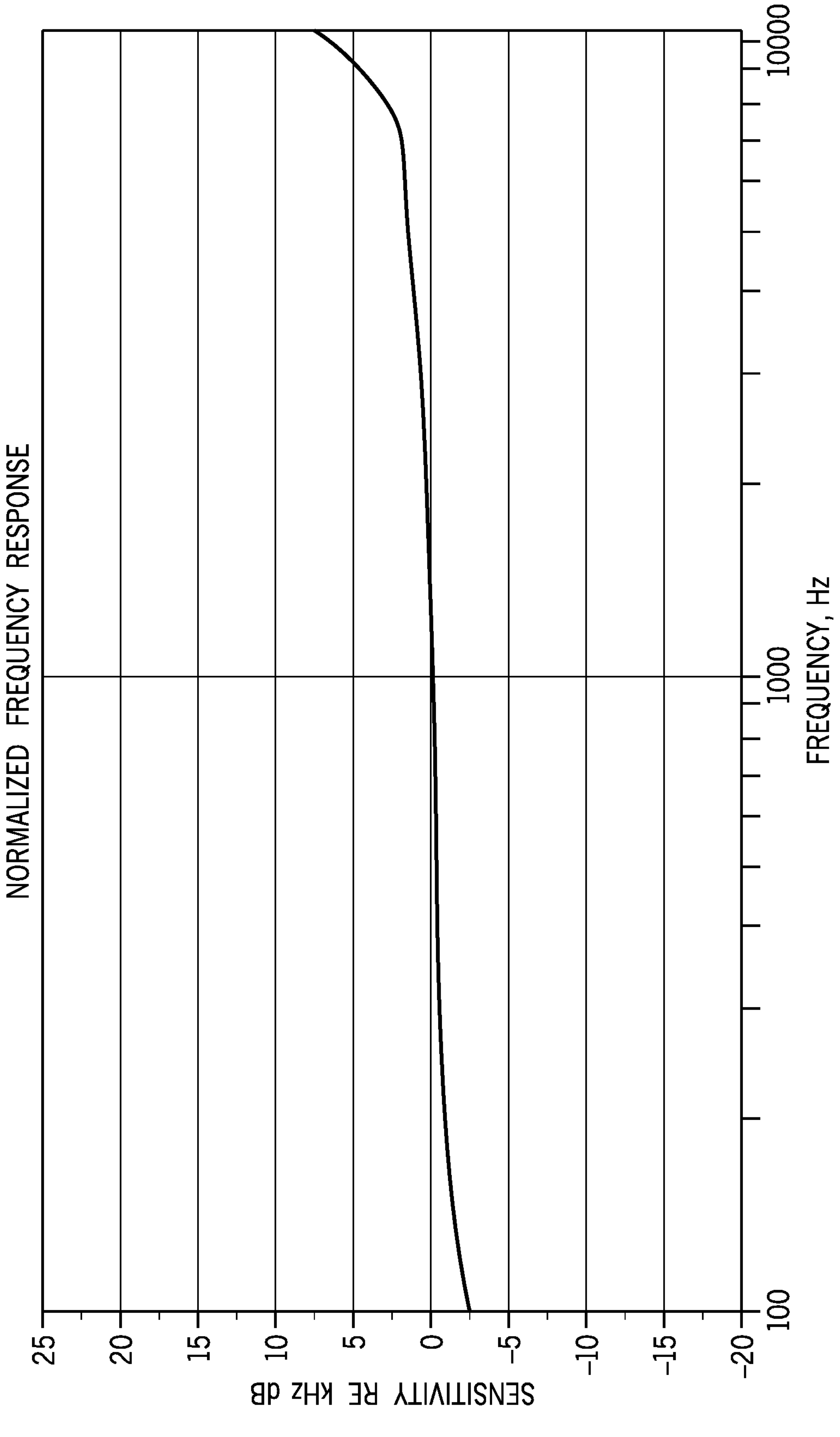
FIG. 5 is a graphical plot of a typical prior art MEMS microphone response.
Figure 6:
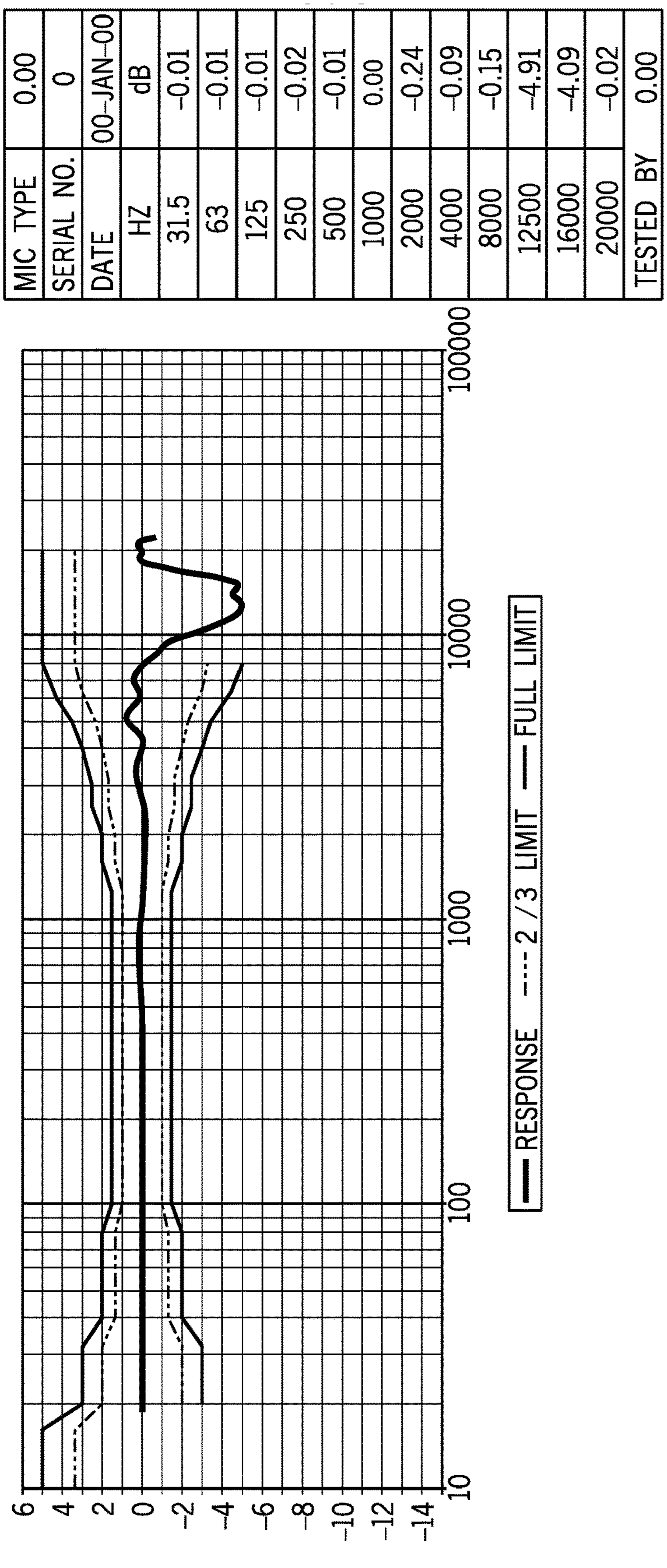
FIG. 6 is a graphical plot of the free field response of the example MEMS microphone of FIG. 1.
Figure 7:
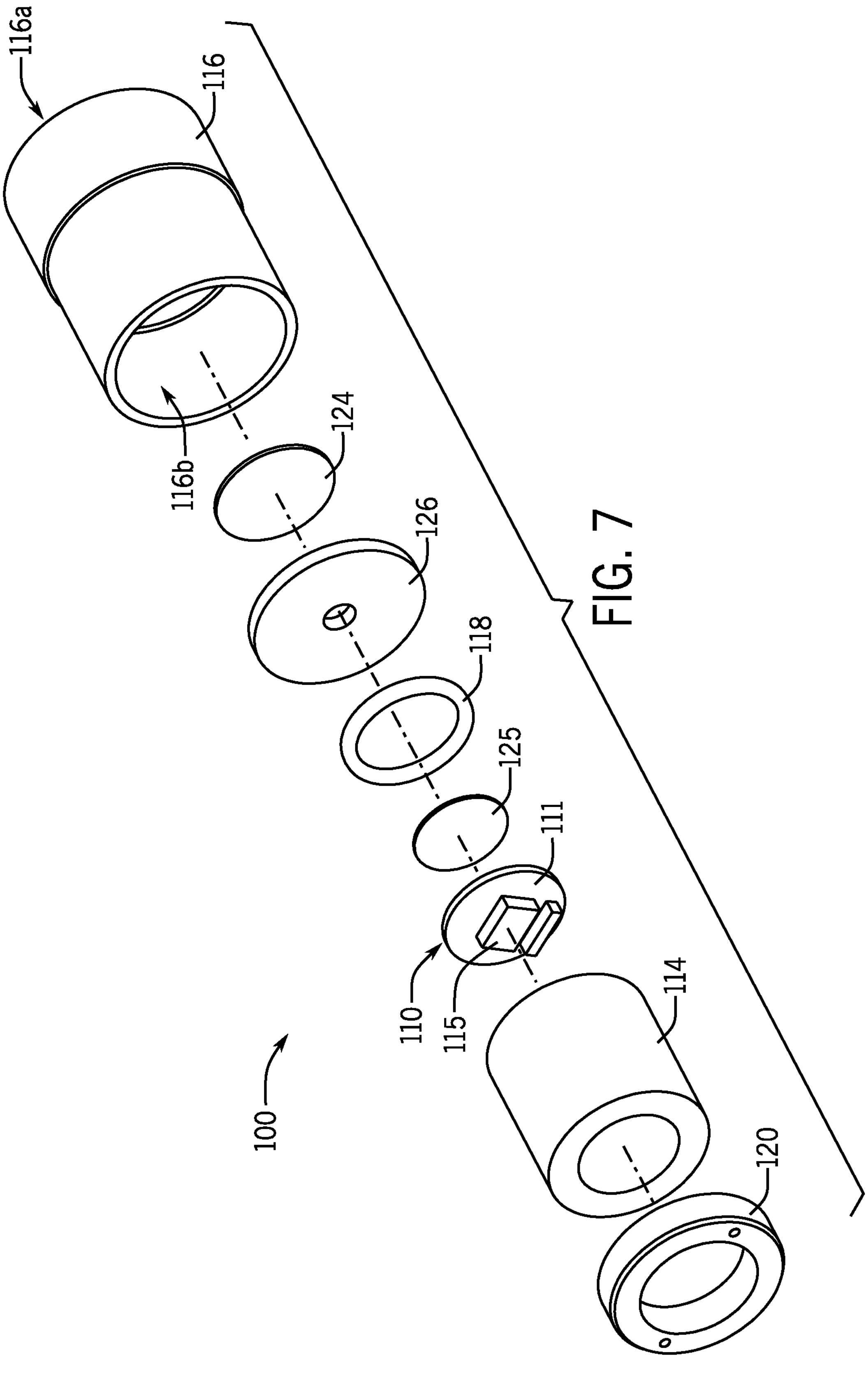
FIG. 7 is an exploded perspective view of another example MEMS microphone with ingress protection.
Figure 8:
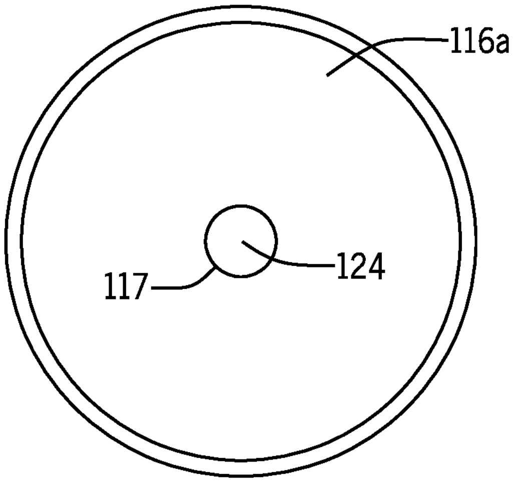
FIG. 8 is a top plan view of the example microphone of FIG. 7.
Figure 9:
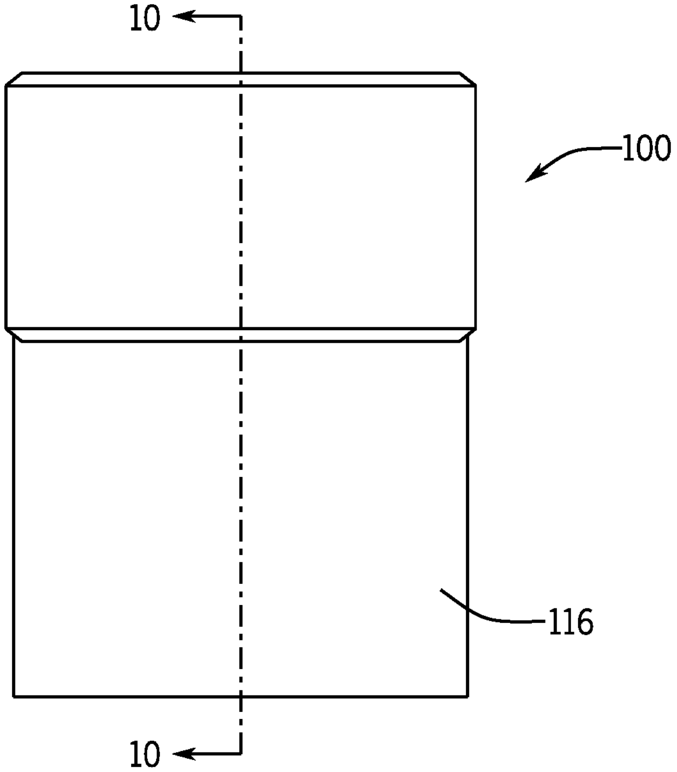
FIG. 9 is a side elevational view of the example microphone of FIG. 7.

FIG. 5 illustrates a microphone response of a typical prior art MEMS microphone assembly. More precisely, the plot illustrates a normalized frequency response by plotting a sensitivity against a frequency. FIG. 6, meanwhile illustrates a plot of a measured response of the example MEMS microphone assembly 10, as compared to Class 2 limits.

Referring now to FIGS. 6-9, there is illustrated another example MEMS microphone assembly 100. The example MEMS microphone assembly 100 is constructed in a similar fashion as the example MEMS microphone assembly 10. In this instance, the MEMS microphone assembly 100 comprises a MEMS microphone PCB S/A 110 (Printed Circuit Board Sub-Assembly) comprising a microphone PCB 111 defining an aperture 113 located adjacent a microphone 115. As with the previous example, it will be understood that any suitable MEMS microphone (e.g., microphone PCB 111, aperture 113, and/or microphone 115) may be utilized as desired.

In this example, the MEMS microphone PCB S/A 110 is supported by a PCB support 114, which in this instance is generally shaped as a hollow cylinder. The PCB support 114 is, in turn, located within a microphone housing 116. In this example, the microphone housing 116 is generally shaped as an elongated hollow cylinder that is configured to fit over an outer surface of the PCB support 114. More precisely, the microphone housing 116 comprises an open end sized, configured, and arranged to accept insertion of the PCB support 114, and a closed end 116*a* defining an aperture 117. The aperture 117 may be any suitable size and configured to allow passage of sound therethrough. In the illustrated example, the aperture 117 is acoustically coupled to the aperture 113. The microphone PCB 111 and/or microphone 115 may be at least partially or completely mounted within the microphone housing 116.

As will be appreciated, the aperture 117 may also allow ingress of various foreign contaminants, such as for instance, fluid, debris, or other similar containment. To assist in the substantial prevention of any ingress of a foreign contaminant, a first acoustic vent 124 is provided adjacent the aperture 117. As previously noted, the first acoustic vent 124 may be any suitable acoustic vent material and in this example, the first acoustic vent 124 is a GORE® Portable Electronic Vent for Acoustic and Immersion applications available from W. L. Gore & Associates, Inc, Elkton, MD, USA, model GAW112. The first acoustic vent 124 is supported by a porous material 126, such as an acoustic tuning material, for instance a foam disk. When assembled (see FIG. 10), the first acoustic vent 124 is located between the microphone housing 116 and the porous material 126. In this example, the first acoustic vent 124 is adhered to the closed end 116*a* (e.g. sealingly mounted) and it will be understood that any suitable method of locating the vent may be utilized, including for instance pressing the first acoustic vent 124 against the closed end 116*a* by the porous material 126.

Figure 10:
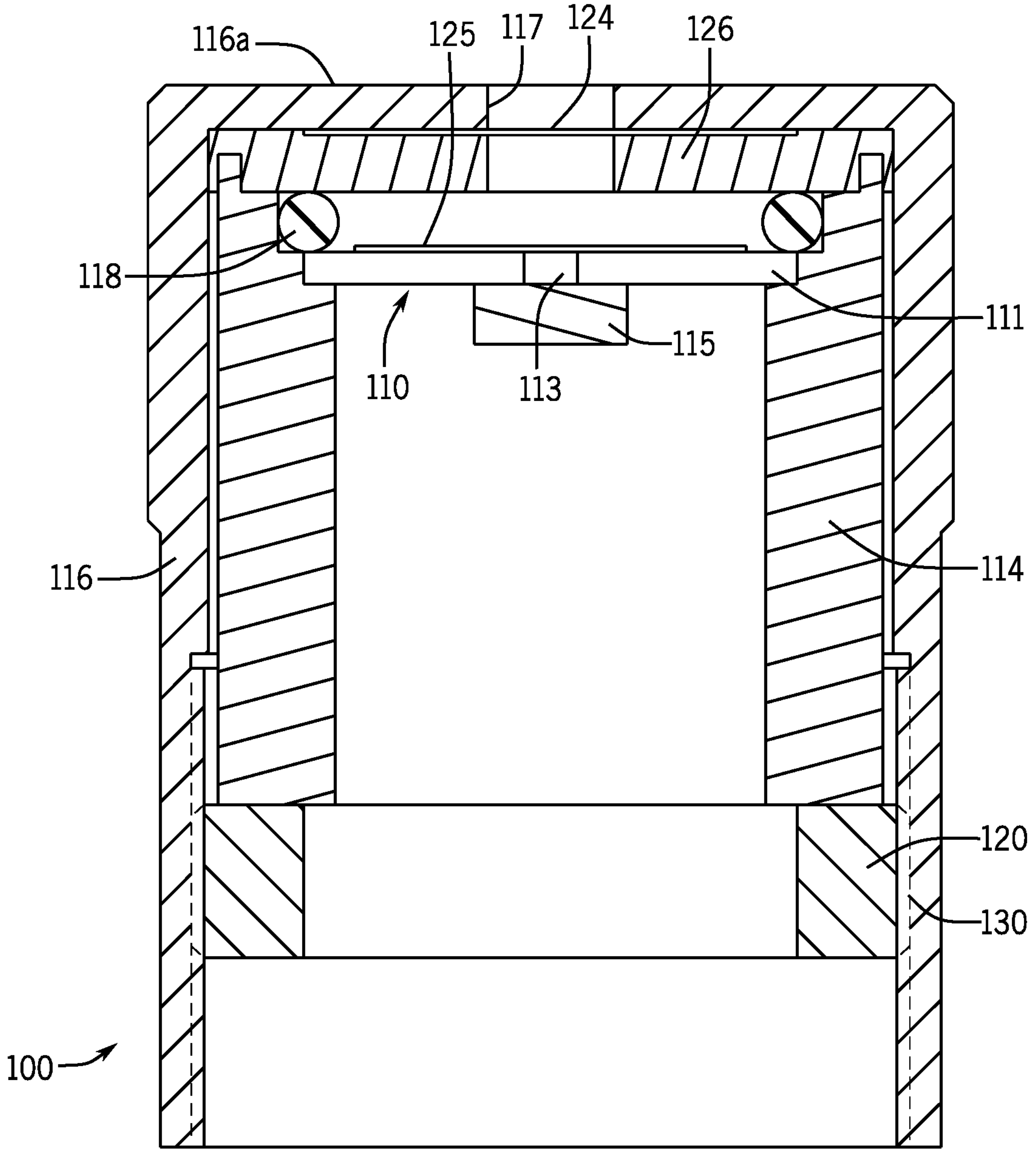
FIG. 10 is a cross section view of the example MEMS microphone of FIG. 7, taken along line 10-10 of FIG. 9.

The porous material 126, meanwhile, is similarly supported by the PCB support 114 and is separated from the MEMS microphone PCB S/A 110 by a distance. A gasket seal 118 is located between the MEMS microphone PCB S/A 110 and the microphone housing 116. In this example, the gasket seal 118 is an "O-ring" shaped resilient gasket. As best seen in FIG. 10, the MEMS microphone PCB S/A 110 may also comprise a second acoustic vent 125 located adjacent and sealingly mounted to the aperture 113 and further assisting in substantially preventing any foreign containments from entering the aperture 113. In the illustrated example, the second acoustic vent 125 is a GORE® Portable Electronic Vent for Acoustic and Immersion applications available from W. L. Gore & Associates, Inc, Elkton, MD, USA, model GAW334. It will be understood that in other embodiments, the first acoustic vent 124 or the second acoustic vent 125 may be omitted as desired. Moreover, it will be further understood that while the example acoustic vents are disclosed as being specific models from a specific manufacture, one of ordinary skill in the art will appreciate that any suitable manufacturer or model may be utilized as desired.

The PCB support 114 and all supported components may be secured within the microphone housing 116 by a lock ring 120. In this example, the lock ring 120 is sized and arranged to be inserted into the microphone housing 116 and provide a securable fit between the lock ring 120 and the microphone housing 116 to securely retain the components within the microphone housing 116. For instance, the lock ring 120 may include a screw thread for coupling with an inner surface of the microphone housing 116. Other suitable methods of mounting the lock ring 120 may be employed as desired. As with the example of FIGS. 1-5, the selection of materials and the adjustability of the securing location of the MEMS microphone PCB S/A 110 within the housing allows for tuning of the MEMS microphone assembly 100 and the achievement of various desired acoustical characteristics, including IEC 61672 Class 2 compliance.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A microphone assembly comprising:

a microphone housing defining an acoustic cavity and comprising a sound inlet for transmitting a sound into the acoustic cavity;

a micro-electro-mechanical (MEMS) microphone operatively mounted at least partially within the microphone housing and comprising an aperture acoustically coupled with the acoustic cavity for receiving the sound;

a MEMS microphone support adjustably coupled to the microphone housing for supporting the MEMS microphone within the microphone housing, the MEMS microphone support being movable relative to the acoustic cavity; and an acoustic vent located between the acoustic cavity and sealingly mounted to the aperture;

wherein the MEMS microphone is separated from a closed end of the microphone housing by a distance, and further comprising a sealing gasket positioned between the closed end and the MEMS microphone.

2. The microphone assembly according to claim 1, wherein the microphone assembly is IEC 61672 Class 2 compliant.

3. The microphone assembly according to claim 1, wherein movement of the MEMS microphone support varies a size of the acoustic cavity.

4. The microphone assembly according to claim 1, wherein the microphone housing and the MEMS microphone support are generally cylindrical and the MEMS microphone support is at least partially mounted within the microphone housing.

5. The microphone assembly according to claim 1, wherein the microphone housing comprises a longitudinal housing axis and the MEMS microphone support comprises a longitudinal support axis and the microphone housing and the MEMS microphone support are coaxially aligned.

6. The microphone assembly according to claim 1, further comprising a lock ring adjustably mounted to the microphone housing to secure the MEMS microphone within the microphone housing.

7. The microphone assembly according to claim 1, wherein the microphone housing is generally cylindrical and comprises an open end for receiving the MEMS microphone and the closed end opposite the open end, the closed end comprising a housing aperture extending from the closed end towards the MEMS microphone, and further comprising a housing acoustic vent adjacent the housing aperture.

8. The microphone assembly of according to claim 1, further comprising an acoustic tuning material adjacent the closed end of the microphone housing.

9. The microphone assembly according to claim 8, wherein the MEMS microphone is separated from the acoustic tuning material by a distance, and further comprising a sealing gasket positioned between the acoustic tuning material and the MEMS microphone.

10. A microphone assembly comprising:

a microphone housing defining an acoustic cavity and comprising a sound inlet for transmitting a sound into the acoustic cavity;

a micro-electro-mechanical (MEMS) microphone operatively mounted at least partially within the microphone housing and comprising an aperture acoustically coupled with the acoustic cavity for receiving the sound;

a MEMS microphone support adjustably coupled to the microphone housing for supporting the MEMS microphone within the microphone housing, the MEMS microphone support being movable relative to the acoustic cavity; and an acoustic vent located between the acoustic cavity and sealingly mounted to the aperture;

wherein the microphone housing is generally cylindrical and comprises an open end for receiving the MEMS microphone and a closed end opposite the open end, the closed end comprising a housing aperture extending from the closed end towards the MEMS microphone, and further comprising a housing acoustic vent adjacent the housing aperture.

11. The microphone assembly of according to claim 10, further comprising an acoustic tuning material adjacent the closed end of the microphone housing;

wherein the MEMS microphone is separated from the acoustic tuning material by a distance, and further comprising a sealing gasket positioned between the acoustic tuning material and the MEMS microphone.

12. The microphone assembly of according to claim 10, wherein the microphone housing and the MEMS microphone support are generally cylindrical and the MEMS microphone support is at least partially mounted within the microphone housing.

13. The microphone assembly according to claim 10, wherein the microphone assembly is IEC 61672 Class 2 compliant.

14. The microphone assembly according to claim 10, wherein movement of the MEMS microphone support varies a size of the acoustic cavity.

15. A microphone assembly comprising:

a microphone housing defining an acoustic cavity and comprising a sound inlet for transmitting a sound into the acoustic cavity;

a micro-electro-mechanical (MEMS) microphone operatively mounted at least partially within the microphone housing and comprising an aperture acoustically coupled with the acoustic cavity for receiving the sound;

a MEMS microphone support adjustably coupled to the microphone housing for supporting the MEMS microphone within the microphone housing, the MEMS microphone support being movable relative to the acoustic cavity;

an acoustic vent located between the acoustic cavity and sealingly mounted to the aperture; and an acoustic tuning material adjacent a closed end of the microphone housing;

wherein the MEMS microphone is separated from the acoustic tuning material by a distance, and further comprising a sealing gasket positioned between the acoustic tuning material and the MEMS microphone.

16. The microphone assembly according to claim 15, wherein the microphone assembly is IEC 61672 Class 2 compliant.

17. The microphone assembly according to claim 15, wherein movement of the MEMS microphone support varies a size of the acoustic cavity.

18. The microphone assembly according to claim 15, further comprising a lock ring adjustably mounted to the microphone housing to secure the MEMS microphone within the microphone housing.

19. The microphone assembly according to claim 15, wherein the microphone housing and the MEMS microphone support are generally cylindrical and the MEMS microphone support is at least partially mounted within the microphone housing.

* * * * *